United States Patent [19]
Hayashi et al.

[11] Patent Number: 4,947,344
[45] Date of Patent: Aug. 7, 1990

[54] METHOD OF ROTATING IMAGE DATA IN A PARTITIONED DISPLAY BUFFER

[75] Inventors: Yasumasa Hayashi, Fujisawa; Katsumasa Oka, Chigasaki; Hiroshi Satoh, Yamoto, all of Japan

[73] Assignee: International Business Machines Corporation, Armonk, N.Y.

[21] Appl. No.: 364,550

[22] Filed: May 17, 1989

Related U.S. Application Data

[63] Continuation of Ser. No. 80,268, Jul. 31, 1987, abandoned.

[30] Foreign Application Priority Data

Sep. 12, 1986 [JP] Japan .................................. 61-214232

[51] Int. Cl.⁵ .............................................. G06F 15/62
[52] U.S. Cl. .................................... 364/518; 364/521; 340/727
[58] Field of Search ....................... 364/518, 519, 521; 340/723, 727; 382/46

[56] References Cited

U.S. PATENT DOCUMENTS

| | | | |
|---|---|---|---|
| 4,084,195 | 10/1978 | Pereira ................................ | 358/280 |
| 4,168,488 | 9/1979 | Evans ............................... | 340/727 X |
| 4,271,476 | 6/1981 | Lotspiech ........................ | 340/727 X |
| 4,593,407 | 6/1986 | Konishi et al. .................. | 340/727 X |
| 4,636,783 | 1/1987 | Omachi .............................. | 340/727 |
| 4,694,405 | 9/1987 | Bradbury et al. ................... | 364/518 |
| 4,716,533 | 12/1987 | Ohmori .............................. | 364/518 |
| 4,736,442 | 4/1988 | Kornfeld ........................ | 340/727 X |
| 4,806,985 | 2/1989 | Sawada .............................. | 340/727 |
| 4,808,985 | 2/1989 | Tanuma et al. ..................... | 340/727 |

FOREIGN PATENT DOCUMENTS

0158314 7/1985 European Pat. Off. .
57-130144 1/1982 Japan .

Primary Examiner—Gary V. Harkcom
Assistant Examiner—Mark K. Zimmerman
Attorney, Agent, or Firm—Marc D. Schechter

[57] ABSTRACT

A method of operating a graphics system, in which a host processor sends a display terminal image data and image orders. The image orders coordinate the position and size of a source rectangle area and the postion of a destination rectangle area in an image storage memory. The image data of the souce rectangle area is rotated by a rotation angle of 90 degrees, 180 degrees or 270 degrees and is stored in the image storage memory. The image storage memory operates as a storage buffer of a display unit, which displays the image data of the destination rectangle area. The image storage memory is partitioned into areas of K bits. Image data is rotated in blocks of K×K bits.

4 Claims, 6 Drawing Sheets

METHOD OF ROTATING IMAGE DATA IN A PARTITIONED DISPLAY BUFFER

This is a continuation of application Ser. No. 07/080,268, filed July 31, 1987, now abandoned.

BACKGROUND OF THE INVENTION

This invention relates to the rotation of image data of a source rectangle area of a document. Particularly, the invention relates to the rotation of the image data of the source rectangle area by 90 degrees or 270 degrees wherein the rotated image data is stored into a destination rectangle area in an image storage means which is partitioned by boundary lines separated from each other by K bits, with the K bits between the boundary lines being handled as a group of bits, such as a byte or a word during read/write operations of the image storage means.

Many efforts have been developed which rotate image data stored in a memory area by an angle of 90 degrees, 180 degrees or 270 degrees and store the rotated image data in a separate memory area. In traditional image rotation processes, image data to be rotated was rotated in bit by bit process. That is, the first bit of the image data in a source memory area was fetched and stored in a destination memory area to perform the desired image rotation. Next, the second bit was fetched and stored in the destination memory area, and so on. This bit by bit process required a long processing time.

To improve the processing time, an approach disclosed in the Japanese published unexamined patent application Ser. No. 57-130144 was suggested in which the original image data stored in an image data memory is fetched on a word by word basis and the fetched words are stored in a rotation memory. The word consists of N bits, and the rotation memory stores M words. The image data stored in the image data memory, i.e. source memory area is stored in the rotation memory on the word by word basis, and the stored image data is read from the rotation memory in a direction determined by a rotation angle +90 degrees or −90 degrees.

U.S. Pat. No. 4084195, assigned to the assignee of the present invention, discloses an image rotation system for a dot printer wherein image data of a document is stored in a page buffer from which plural pel lines of the image data are stored in a horizontal stripe buffer which has data lines equal to the number of ink jet nozzles of the printer and is partitioned into plural byte columns. An alternate byte included in the byte column is rotated by a 90 degree rotation means and is stored in one of vertical stripe buffers.

These schemes are effective in the case that the read/write operations of the image data memory and a memory area, into which the rotated image data from the rotation memory is stored, are performed on a bit by bit basis, wherein the addresses of the rotated image data of the M bits are freely assigned in the memory area. However, if both the image data memory and the memory area have byte boundaries or the word boundaries wherein the read/write operations are performed on a byte by byte basis or a word by word basis the problem shown in FIG. 2 is encountered.

Figure 2:
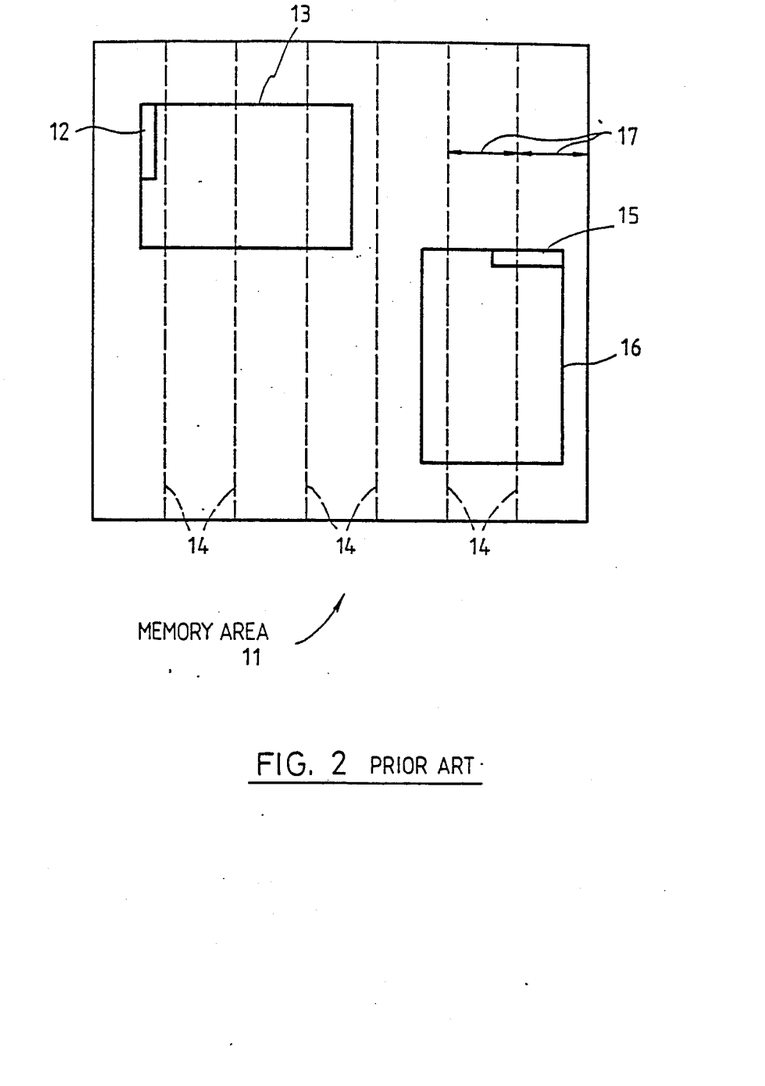
FIG. 2 is an illustration of a prior art rotation scheme.

In FIG. 2, it is assumed that an image 13 is rotated by 90 degrees and stored in an area 16 of a memory area 11, and a memory area 11 has byte boundaries 14. To perform the rotation of the image 13, one byte 12 of the image 13 must be stored into a byte position 15 of the area 16. In this case, the one byte position 15 does not align with the byte boundaries 14, and hence two write cycles 17 are required to store the one byte. Shift operations and a store operation of the remaining bits for each byte are required, resulting in time consuming complicated operations.

DISCLOSURE OF THE INVENTION

In accordance with the present invention, a host processor sends a display terminal image data of a one page document and image orders. The image orders coordinate position and size of a source rectangle area in the one page document, and the coordinate position of a destination rectangle area in the image storage means into which the image data of the source rectangle area rotated by 90 degrees, 180 degrees or 270 degrees is stored. The image storage means operates as a storage buffer of a display unit, which displays the image data of the destination rectangle area in the image storage means.

The image storage means is partitioned by boundary lines separated from each other by K bits. The K bits between the two boundary lines are handled as a group of bits, such as a byte, a word, etc. during the read/write operations of the image storage means, that is, the read/write operations are made on the byte basis or the word basis.

The image data of the source rectangle area is stored in a first buffer which has horizontal bits corresponding to the total horizontal pels of the document and a vertical K bits or K pel lines. The first buffer is divided into plural square blocks each of which has the $K \times K$ bits. The image data in the first buffer is rotated and stored in the image storage means, as described hereinafter.

The control means, such as a microprocessor of the display terminal decodes the coordinate position and the size of the source rectangle area and the coordinate position of the destination rectangle area, and finds or detects a space, which is represented by M bits, between a byte or word boundary of the image storage means and an edge area of the destination rectangle area into which an edge area, such as a top edge area of the source rectangle area is stored after being rotated by the rotation angle, such as 90 degree rotation in the clockwise direction. The microprocessor stores the image data of the top edge area of the source rectangle area into the first buffer wherein the space which is equal to M bits is provided above the image data of the top edge area. The microprocessor fetches the $K \times K$ bits of one of blocks storing the top edge area in the first buffer and stores the fetched $K \times K$ bits into a rotation buffer of the $K \times K$ bits. To perform the selected rotation, the microprocessor sequentially fetches each of K bit groups from the rotation buffer in a direction in accordance with the selected rotation angle, and stores the fetched each K bit group into a second buffer of the $K \times K$ bits.

Before storing the K bits group into the image storage means, the bits in the spaces between the image data and the byte or word boundaries of the destination rectangle are converted to the zero's (0). And, the microprocessor stores each K bit group (including the image bits and the 0 bits) in the image storage means.

BEST MODE FOR CARRYING OUT THE INVENTION

Figure 1:
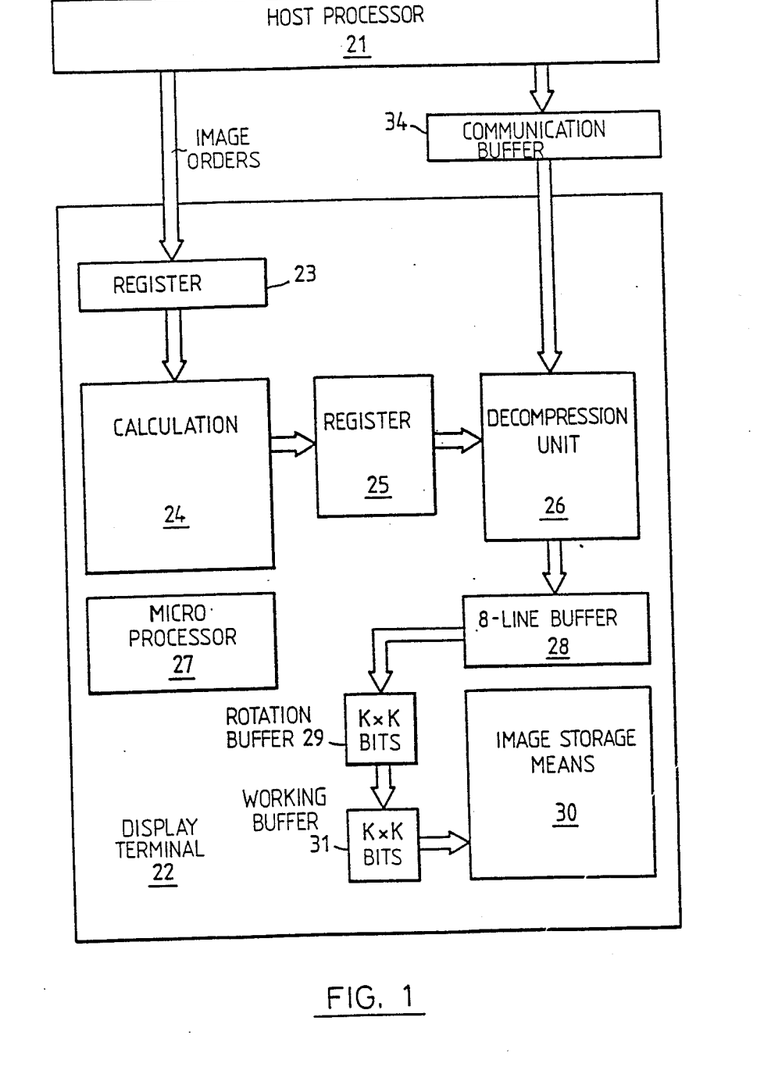
FIG. 1 is a block diagram of an apparatus for rotating image data according to the present invention.

FIG. 1 shows a block diagram in accordance with the present invention. A host processor 21 is a central processing unit and controls plural display terminals 22 connected to the host processor 21 through communication lines. The display terminal 22 includes a register 23, a calculation unit 24, a register 25, a data decompression unit 26, a microprocessor 27, a first buffer or an eight line buffer 28, a rotation buffer 29, a second buffer or a working buffer 31, an image storage means 30, and a display unit (not shown). The image storage means 30 operates as a buffer of the display unit, which displays the rotated image data in the rectangle area stored in the image storage means 30.

The microprocessor 27 performs the various control operations of the above components of the display terminal 22 through control lines connected to the components. These control lines, however, are not shown in the FIG. 1 to simplify the drawing.

A communication buffer 34 of 7 k bytes is shown between the host processor 21 and the display terminal 22. The communication buffer 34 is located in a communication interface, not shown in FIG. 1, which operates as an interface between the host processor 21 and the display terminal 22. Both the image orders and the image data of the one page document 36 (e.g. FIGS. 3 and 4) in a compressed form are supplied to the communication interface, from which the image orders are immediately supplied to the display terminal 22, and the compressed image data is held in the communication buffer 34.

The calculation unit 24 generates parameters used for controlling the image rotation process by calculating the data in the register 23. The parameters are then stored in the register 25, so that the display terminal 22 has made preparations for the image rotation process. Then the microprocessor 27 controls the decompression unit 26 to perform the decompression of the compressed image data stored in the communication buffer 34.

Figure 3:
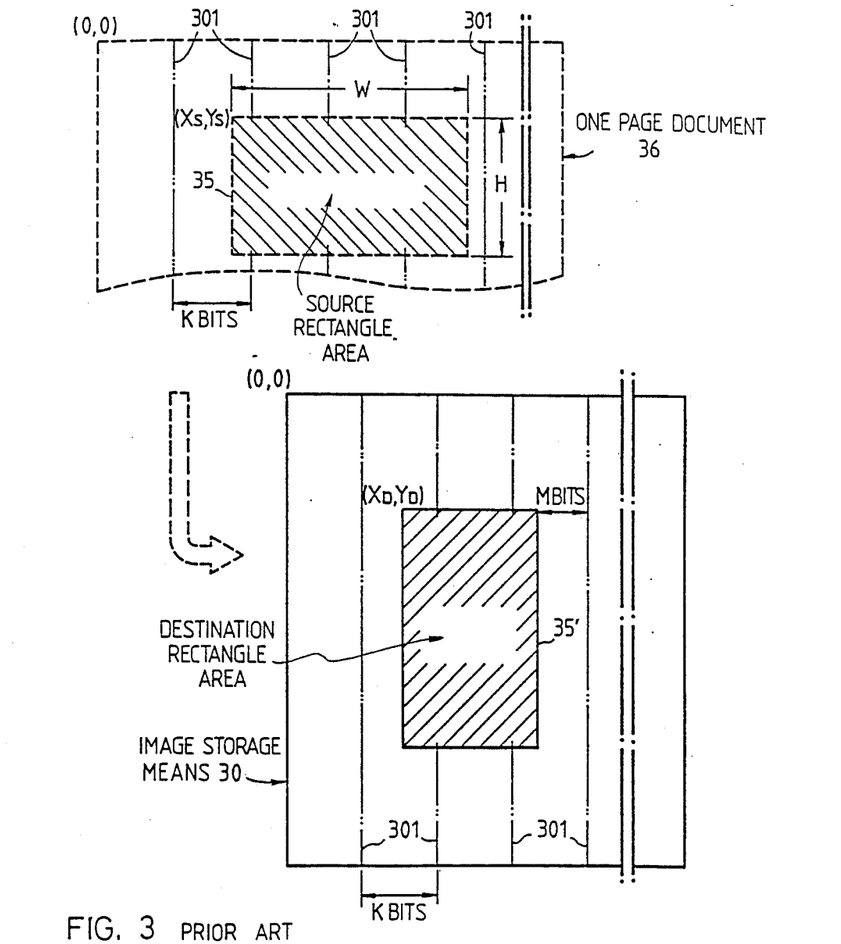
FIG. 3 is an illustration of the source rectangle area of a one page document and the destination rectangle area of an image storage means.

FIG. 3 shows the source rectangle area 35 in the one page document 36 and the destination rectangle area 35' in the image presentation space 30. The image storage means 30 is partitioned by the boundary lines 301 which are separated from each other by K bits. In the embodiment being described, eight bits are used as the exemplary number of K bits. That is, the boundary lines 301 in the image storage means 30 are the byte boundaries, and the read/write operations of the image storage means 30 are made on the byte basis.

The eight line buffer 28 shown in the FIG. 1 has sufficient horizontal bits, for example 256×8 bits, for storing the all horizontal pels of a line of the document 36, and has eight bits in the vertical direction. The eight line buffer 28 is divided to plural square blocks, each of which has 8×8 bits. The first pel positions of the pel lines of the document 36 which includes the source rectangle area 35 are aligned with the first bit positions of the horizontal data lines of the eight line buffer 28, and each of eight pel line group of the image data is sequentially stored in the eight line buffer 28, whereby the document 36 is virtually partitioned by the boundary lines 301. Therefore, virtual bit boundary lines 301 are superimposingly shown on the documents 36. FIG. 3 also shows that the image data of the source rectangle are 35 of the width W and the height H located at the address ($X_s$, $Y_s$) is rotated by 90 degrees or 270 degrees in the clockwise direction and stored in the destination rectangle area 35' located at the address ($X_D$, $Y_D$).

The upper left corner of the image data of the document shown in FIG. 3 is assigned with a coordinate position (0, 0) from which the document is partitioned by the eight bit boundary lines. That is, the first pel of the pel line of the document 36 is aligned with the first bit position of the eight line buffer 28.

Referring to FIG. 1, again, the host processor 21 sends the display terminal 22 the image orders, in advance. The image orders instruct the display terminal 22 to extract the image data of the source rectangle area 35 from the data stream in the compressed form which represents the one page document 36, to rotate the image data of the source rectangle area 35 by 90 degrees, 180 degrees or 270 degrees, and to store the rotated image data into the destination rectangle area 35 of the image storage means 30.

The image orders also specify the following (FIG. 3):

Coordinate position ($X_s$, $Y_s$), width W and height H of the source rectangle area 35 on the one page document 36;

Coordinate position ($X_D$, $Y_D$) of the destination rectangle area 35' in the image storage means 30 into which the rotated image data of the source rectangle area 35 is stored; and Rotation angle, i.e. 90 degrees, 180 degrees or 270 degrees.

This data is stored in the register 23 shown in the FIG. 1. The calculation unit shown in FIG. 1 calculates the above data to generate the following parameters for the processing of the top edge area of the source rectangle area 35, which are stored in the register 25:

(a) Pel line number of the source rectangle area 35 counted from the top pel line of the document.

The pel line number is called pointer 1 hereinafter. Initially, the pointer 1 specifies the first pel line of the source rectangle area 35, and is incremented to specify the next pel line as the process proceeds.

(b) Pel line number in the eight line buffer 28 into which the decompressed image data of one pel line is written.

The pel line number in the buffer 28 is called pointer 2 hereinafter. In the 90 degree rotation in the clockwise direction, the initial value of the pointer 2 is equal to M+1 (bits), shown in FIG. 4. The pointer 2 is also incremented as the process proceeds.

(c) Bit line number in the working buffer 31 from which the bit line or one byte is fetched. This bit line number is called pointer 3 hereinafter. In the 90 degree rotation in the clockwise direction, the initial value of the pointer 3 is equal to N+1 (bits), shown in FIG. 4. The pointer 3 is also incremented as the process proceeds.

(d) Block number of the eight line buffer 28 from which 8×8 bits, i.e. one block image data, is fetched to the rotation buffer 29. The block number is called pointer 4 hereinafter. The pointer 4 is also incremented as the process proceeds.

(e) Count values representing the width W and the height H of the source rectangle area 35 for controlling the fetch operations which sequentially fetches the blocks.

These parameters (a) through (e) are stored in the register 25. The microprocessor 27 refers to the parameters and increments the pointers to perform the image rotation process ordered by the host processor 21. After the parameters have been stored in the register 25, that is, the display terminal 22 has made preparations for the image rotation process, the display terminal 22 starts to process the image data in the compressed form of the one page document 36 stored in the communication buffer 34. The data compression and decompression scheme could be one of one-dimensional or two-dimensional compression and decompression scheme which is well known in the art. Accordingly, the details of the data compression and decompression scheme are not described in the specification.

The detailed operation in accordance with the invention will now be described with reference to FIGS. 1, 3, 4, 5 and 6. The microprocessor 27 starts the operations in a block 501 of the FIG. 5. In a block 502, under the control of the microprocessor 27, the calculation unit 24 calculates the data stored in the register 23 and generates the next parameters (a) through (e).

Figure 4:
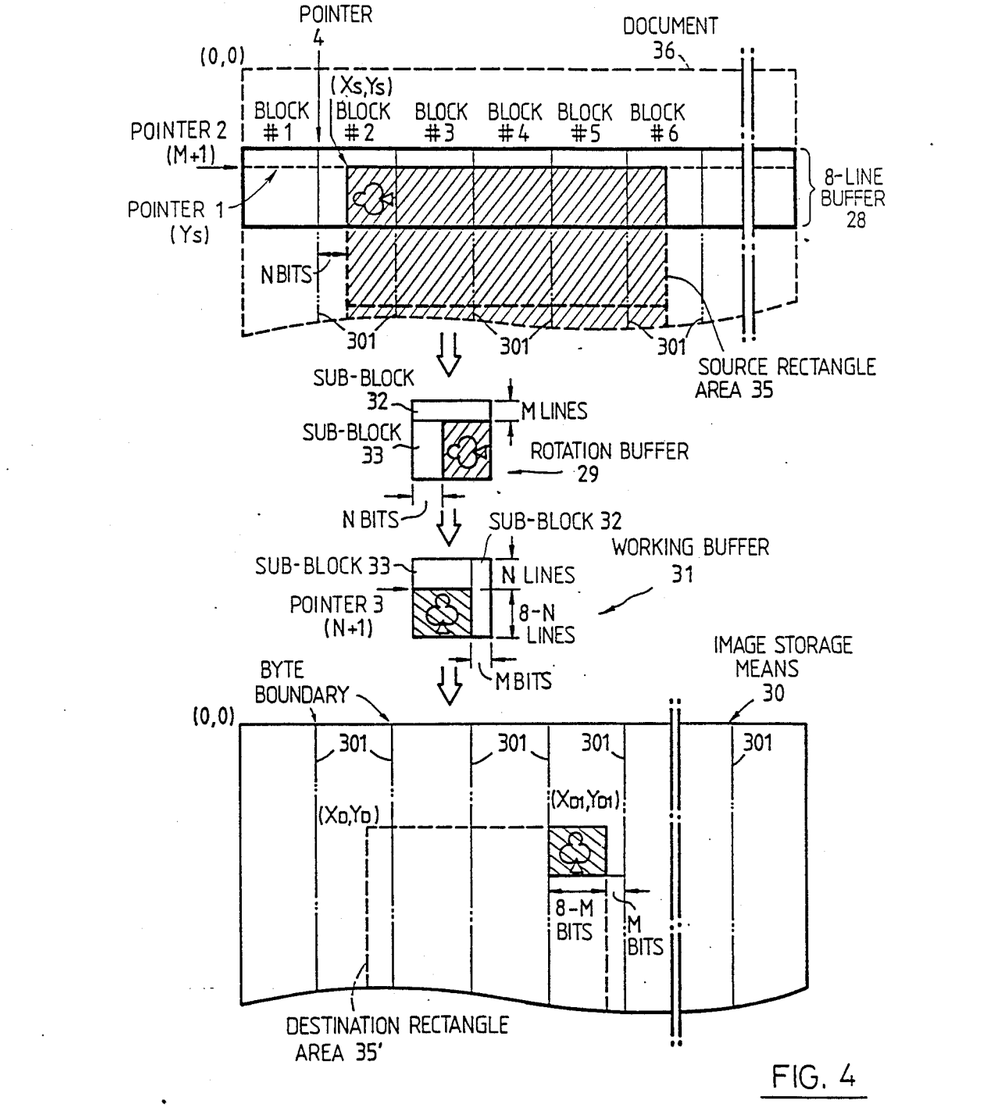
FIG. 4 is an illustration of the operations for rotating the image data of the source rectangle area and storing the rotated image data into the destination rectangle area of the image storage means.

The parameters stored in the register 25 in the exemplary case shown in the FIG. 4 are as follows:

(a) The initial value of the pointer 1=Ys
(b) The initial value of the pointer 2=M+1
(c) The initial value of the pointer 3=N+1
(d) The initial value of the pointer 4=2
(e) The count value in the horizontal direction=W
The count value in the vertical direction=H As shown in the FIG. 4, the M bits represent the space, i.e. the number of bits between the right edge of the destination rectangle area 35' and the boundary line 301 in the image storage means 30, and the N bits represent the number of bits between the left edge of the source rectangle area 35 and the boundary line 301. The microprocessor 27 generates the values M and N by calculating the data Xs, Ys, W, H, $X_D$ and $Y_D$ and the address of the boundary lines 301 in the calculation unit 24. The M bits in the image storage means 30 corresponds to M lines in the rotation buffer 29, and the N bits in the rotation buffer 29 corresponds to N lines in the working buffer 31.

More particularly, the first pel positions of the pel lines of the document 36 which includes the source rectangle area 35 are aligned with the first bit positions of the horizontal data line of the eight line buffer 28, and each of eight pel lines group of the image data is sequentially stored in the eight line buffer 28, whereby the document 36 is virtually partitioned by the boundary lines 301, as stated hereinbefore. The write operations of the top edge area of the document 36 into the eight line buffer 28 is made to provide the space, i.e. M lines. The N bits in a block #2, which will be described as a sub-block 33 hereinafter, are the bits to be ignored after rotated. The microprocessor 27 starts to decompress the compressed image data in the communication buffer 34 from the top pel line of the document 36. The microprocessor 27 counts the pel lines being decompressed, as the decompress operations proceed.

The microprocessor 27 does not store the decompressed image data in the eight line buffer 28 until the count value becomes equal to the value of the pointer 1, i.e. Ys. When count value becomes equal to the value Ys of the pointer 1, the image data from the left edge to the right edge of the document of the pel line Ys is written in the line of the eight line buffer 28 pointed by the value M+1 of the pointer 2, and the microprocessor 27 increments the value Ys of the pointer 1 to the value Ys+1, and increments the count value. And, the microprocessor also increments the pointer 2 to value M+2. Since the incremented values of the pointer 1 and the count are equal, the entire image data of the pel line Ys+1 is written in the M+2 line of the eight line buffer 28 pointed by the pointer 2. In this manner, the decompressed image data of the pel line starting at the pel line Ys is sequentially stored in the eight line buffer 28 until it is filled.

Figure 5:
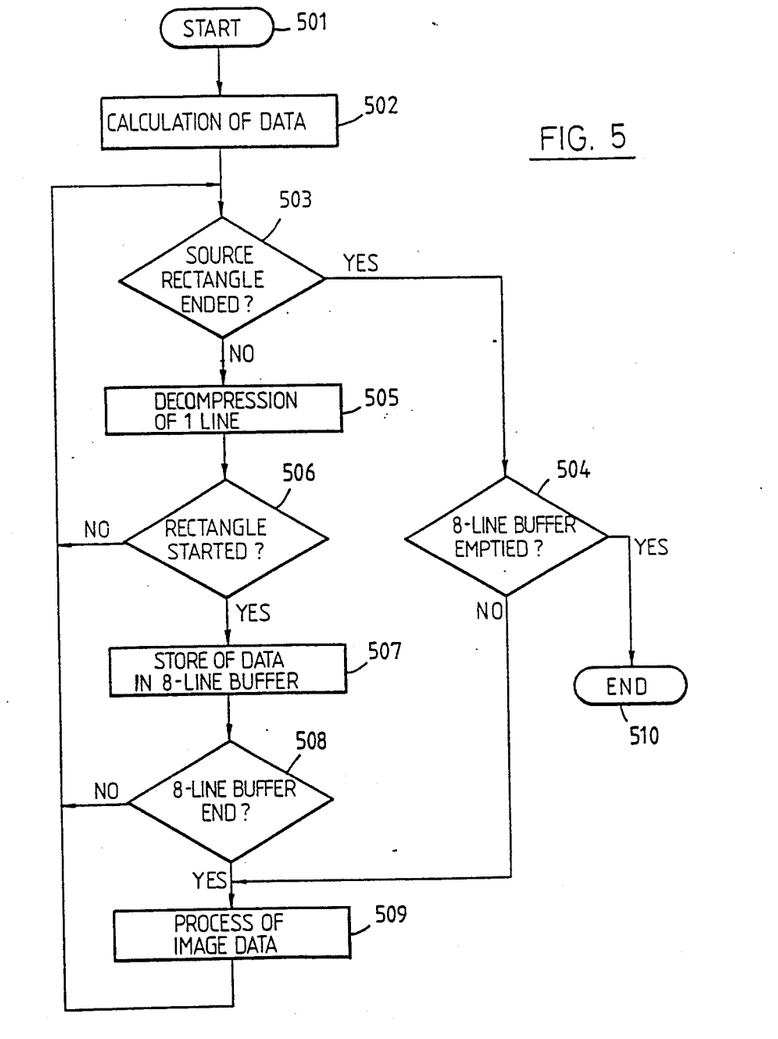
FIG. 5 is a flow chart showing the entire process of the present invention.

These operations are shown in blocks 503 through 508 in the FIG. 5. In block 503, the microprocessor 27 determines if the process of the source rectangle area 35 has been ended. If no, the compressed image data corresponding to one pel line is decompressed in a block 505. The microprocessor 27 determines if the count value of the decompressed pel line becomes equal to the value of the pointer 1 in a block 506. If no, the operations return to the block 503. If yes, the decompressed image data of the one pel line is written in the eight line buffer 28, in the block 507. The microprocessor 27 determines if the eight line buffer 28 is filled, in a block 508. If no, the operations return to the block 503. If yes, the microprocessor 27 starts to perform the rotation process of the image data, in a block 509. If the output of the block 503 is yes, the microprocessor 27 determines if the eight line buffer 28 is emptied, in a block 504. If yes, the operations are ended in a block 510. If no, the operations proceed to the block 509.

Figure 6:
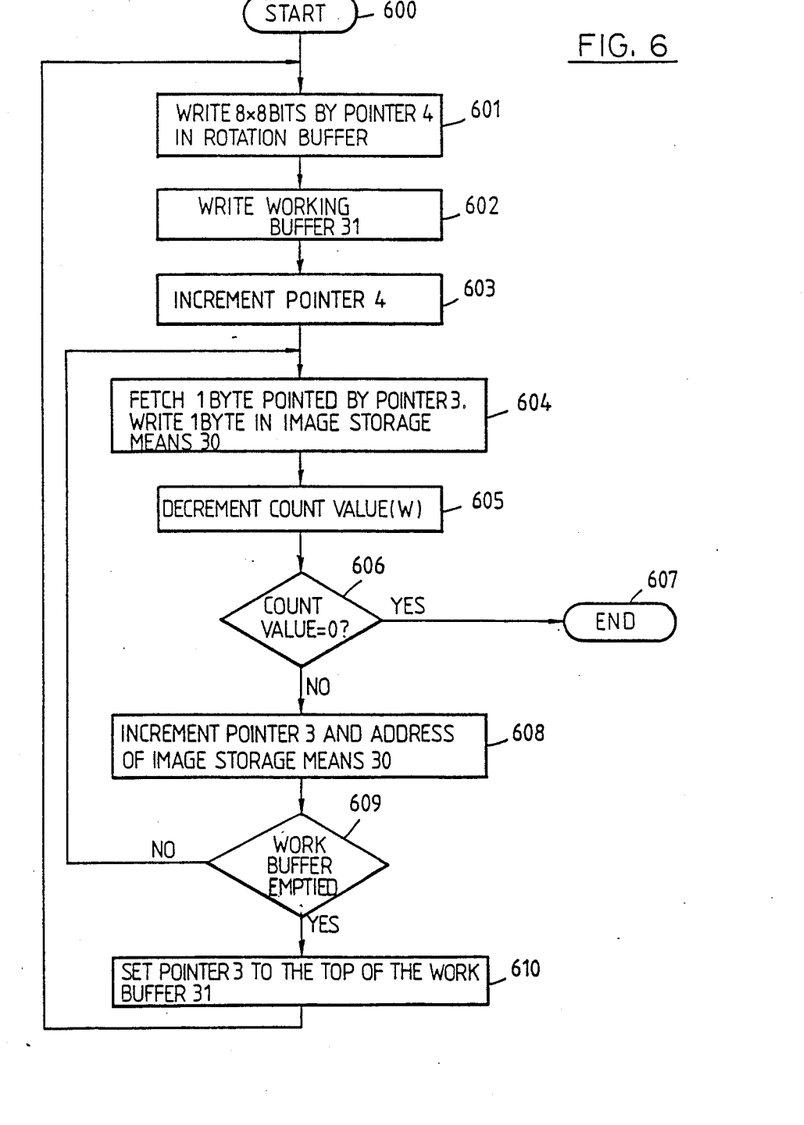
FIG. 6 is a detailed flow chart showing the image process between an eight line buffer and the image storage means.

Detail operations of the block 509 is shown in FIG. 6. The operations start in a block 600. In a block 601, the microprocessor 27 fetches all 8×8 bits in the block #2 of the eight line buffer 28 pointed by the pointer 4 and writes all 8×8 bits into the rotation buffer 29, as shown in the FIG. 4. In a block 602, the microprocessor 27 fetches the 8×8 bits in the rotation buffer 29 in a direction specified by the rotation angle, and writes them in the working buffer 31. In the case of 90 degree rotation in the clockwise direction, the left-most vertical eight bits of the rotation buffer 29 are initially fetched. Among the fetched eight bits, the bits in the sub-block 32 are converted to 0 bits. The left-most vertical eight bits including the converted 0 bits are written into the first horizontal bit line of the working buffer 31 of 8×8 bits, and the next vertical eight bits are fetched from the rotation buffer 29 and the bits included in the sub-block 32 are converted to the 0 bits and these eight bits are written in the second horizontal bit line of the working buffer 31.

As a result, the 8×8 bits including the image data in the rotation buffer 29 are rotated by 90 degrees and stored in the working buffer 31, as shown in the FIG. 4. It is noted that the bits in the sub-block 32 have been converted to the 0 bits, as described above. In a block 603, the microprocessor 27 increments the pointer 4 to a value 3 which points to the next block #3 of the eight line buffer 28.

Next, the microprocessor 27 fetches the image data stored in the working buffer 31 and writes the image data into the image storage means 30, in blocks 604 through 609. More particularly, the microprocessor 27 has generated the address or coordinate position ($X_{D1}$, $Y_{D1}$) of one byte into which the first byte of the image data of the source rectangle area 35 stored in the working buffer 31 is written. The address ($X_{D1}$, $Y_{D1}$) has been generated based upon the address ($X_D$, $Y_D$) of the destination rectangle area 35' and the data H representing the height of the source rectangle area 35 included in the image orders sent from the host processor 21. In the block 604, the microprocessor 27 refers to the pointer 3, the initial value of which is N+1, and fetches first one byte at the N+1 data line of the working buffer 31, as shown in the FIG. 4. That is, the microprocessor 27 starts the fetch and write operations of the bytes at the N+1 byte, in a block 604.

The microprocessor 27 also converts the 8-M bits of the first one byte at the address ($X_{D1}$, $Y_{D1}$) of the image storage means 30 to the 0 bits and performs the write operations of the first one byte pointed by the pointer 3 into the byte position ($X_{D1}$, $Y_{D1}$) by performing the logical OR operations of the fetched first one byte of the buffer 31 and the first one byte at the address ($X_{D1}$, $Y_{D1}$).

It is noted that the background data in the image storage means 30 surrounding the destination rectangle area 35' is not destroyed since the M bits of each byte are 0 bits, which overlap on the background data in the image storage mean 30.

The microprocessor 27, in a block 605 decrements the count value (W) by one to the value W-1 in this case. And, in a block 606, the microprocessor 27 determines if the decremented count value is equal to zero. If yes, the operations are terminated in a block 607. If no, the microprocessor 27 increments the pointer 3 by one and the byte address of the image storage means 30 by one, in a block 608. In a block 609, the microprocessor 27 determines if the working buffer 31 is emptied. If no, the process is returned to the block 604. If yes, the microprocessor 27 sets the pointer 3 to point the top byte line of the working buffer 31, in a block 610. And, the process is returned to the block 601, wherein the 8×8 bits in the next block pointed by the pointer 4 are written into the rotation buffer 29.

Describing in detail the loop of the blocks 604-609, a second one byte in the working buffer 31 which is pointed by the incremented pointer 3 (N+2) is fetched in the block 604 in response to the NO output of the block 609. The 8-M bits of the second one byte of the image storage means 30 are converted to the 0 bits, and the logical OR operations of both the second one bytes are performed, so that the second one byte in the working buffer 31 is stored in the second byte of the image storage means 30. The operational loop through the blocks 604-609 is repeated until the eight bytes in the working buffer 31 have been stored in the image storage means 30. When the eight bytes in the working buffer 31 have been stored in the image storage means, which is indicated by the output YES of the block 609, the process is returned to the block 601 in which the 8×8 bits of the next block (block #3 through #6) of the eight line buffer 28 are sequentially written into the rotation buffer 29.

During the processing of the last block #6 of the eight line buffer 28, the block 606 in FIG. 6 finds that the count value representing the number of remaining or unprocessed bits in the width W of the document 36 becomes equal to 0, in other words all bits in the width W have been processed. The processing of the first eight pel lines is terminated in the block 607 of FIG. 6, and the operations are returned to block 503 of the FIG. 5.

In block 503, the microprocessor 27 determines if the processing of the source rectangle area 35 has been ended. Since the output of the block 503 is "No" in this case, the second eight pel lines are decompressed from the compressed image data in the communication buffer 34 and written into the eight line buffer 28, and the image rotation process of the second eight pel lines is performed in the manner as already described.

Similarly, the subsequent eight pel lines of the source rectangle area 35 of the document 36 are processed. For each eight pel lines, the block 503 of the FIG. 5 determines if the processing of the source rectangle area 35 is ended. The determination is mad by comparing the total number of processed pel lines of the source rectangle area 35 with the count value H which represents the height of the source rectangle area 35. If the block 503 produces the output YES and the block 504 produces the output YES and the processing of the source rectangle area 35 is ended in the block 510.

In this manner, the first eight pel lines of the decompressed image data of the source rectangle area 35 are stored in the eight line buffer 28, and rotated and stored in the destination rectangle area 35' in the image storage means 30, and the second next eight pel lines of the decompressed image data of the source rectangle area 35 are stored in the eight line buffer 28 from the communication buffer 34, and rotated and stored in the image storage means 30. Although only parameters for the process of the top edge area, i.e. the first eight pel lines of the source rectangle area 35 were described in the specification, the microprocessor 27 updates the parameters in the register 25 for the processing of the subsequent eight pel lines. The microprocessor 27 uses the updated parameters for processing the subsequent, i.e. second, third ..., eight pel lines of the source rectangle area 35, in the manner similar to that described for the processing of the first eight pel lines. It is considered that the values of the parameters for the subsequent eight pel lines are easily obtained by those skilled in the art based upon the description already described. Therefore, the parameters are not described herein.

After the microprocessor 27 has processed the source rectangle area 35, the microprocessor 27 terminates the image rotation process, that is, the microprocessor 27 ignores the image data between the last pel line of the source rectangle area 35 and the end of the document 36.

The microprocessor 27 displays the image data of the destination rectangle area 35' stored in the storage means 30 on the display surface of the display unit, as the rotated image data of each 8×8 bit block is written in the image storage mean 30.

Although the rotated output data of the rotation buffer 29 was written into the image storage means 30 through the working buffer 31, the output data of the rotation buffer 29 could be directly written into the image storage means 30. In this case, the value N+1 of the pointer 3 is controlled to point to the N+1 bit position of the rotation buffer 29.

As described hereinbefore, it is necessary to convert the M bits in each byte to 0 bits before storing them into the image storage means to prevent the background data surrounding the destination rectangle area 35' in the image storage means 30 from being destroyed. In the explained embodiment, the M bits are converted to 0 bits when the eight bits are written into the working buffer 31 from the rotation buffer 29, as described with respect to the block 602 of FIG. 6. However, the M bits could be converted to 0 bits in other processing steps in place of the block 602.

The conversion could be made in the write operations of the eight pel lines into the eight line buffer 28 from the decompression unit 26. Before the eight pel lines are written, all bits in the eight line buffer 28 are reset to 0 bits. Then, the one pel line is written into the eight line buffer 28 in the block 507 of FIG. 5.

Alternatively, the conversion could be made during the write operations in the block 601 of FIG. 6 which writes the 8×8 bits of the one block of the eight line buffer 28 in the rotation buffer 29. At first, all bits in the rotation buffer 29 are reset to the 0 bits. During the write operations of the M lines from the one block of the eight line buffer 28 to the rotation buffer 29, the M lines are masked so that the M lines are not written into the sub-block 32 of the rotation buffer 29. Then, the remaining bits including the image bits are written into the rotation buffer 29 without being masked, whereby the sub-block 32 includes the 0 bits.

Alternatively, the conversion could be made in the write operation in the block 604 of FIG. 6 which writes the byte of the working buffer 31 into the image storage means 30. After fetching one byte from the working buffer 31, the M bits of the fetched one byte are converted to 0 bits.

As stated hereinbefore, the 8×8 bits in the rotation buffer 29 are fetched in a direction determined by the rotation angle. In the case of the 180 degree rotation, the fetch operations from the rotation buffer 29 are made from the bottom horizontal eight bits toward the upper horizontal eight bits, and the write operations into the working buffer 31 are made to write the bottom horizontal eight bits into the top horizontal bit line of the working buffer 31 and the upper most horizontal eight bits into the last horizontal bit line.

In the case of 270 degree rotation in the clockwise direction, the fetch and write operations are made so that the right-most vertical eight bits in the rotation buffer 29 are stored in the top horizontal bit line of the working buffer 31 and the left-most vertical eight bits are stored in the bottom horizontal bit line.

Although a byte boundary is used in the specific embodiment (that is K=8), other boundaries such as 16 bits, 32 bits, etc. could be used.

Although the areas 35 and 35' were described as rectangle areas, the areas could be square areas.

Although the invention has been described with reference to this specific embodiment, this description is not meant to be construed in a limiting sense. Various modification of the disclosed embodiment, as well as other embodiments of the invention, will become apparent to those persons skilled in the art upon reference to the description of this invention.

Having thus described our invention what we claim as new, and desire to secure by letters patent is:

1. A method of rotating image data representing a source rectangle area of a document by a specified rotation angle, said source rectangle area having a source edge and a source edge area adjacent the source edge, said source rectangle area comprising a plurality of lines, each line extending in a direction parallel to the source edge, said image data comprising a plurality of words, each word consisting of K bits of data extending along a line of the source rectangle area in the direction parallel to the source edge, said method comprising the steps of:

partitioning a storage means by at least first and second boundaries separated from each other by K bits in a bit direction perpendicular to the boundaries, said storage means comprising a plurality of lines of storage, each line extending in the bit direction, groups of K bits on a line forming a word, said storage means having a destination rectangle area corresponding to the source rectangle area, said destination rectangle area having a destination edge parallel to and spaced from the boundaries, said destination edge corresponding to the source edge;

calculating the number M of bits between the destination edge and the first boundary of the storage means;

storing image data representing the source edge area in a K-line buffer, said buffer having K lines of storage and having first and second boundaries, the first boundary of the K-line buffer corresponding to the first boundary of the storage means, the second boundary of the K-line buffer corresponding to the second boundary of the storage means, each line of the K-line buffer extending in a line direction parallel to the boundaries of the K-line buffer, said K-line buffer being partitioned into blocks, each block having a size of K×K bits, each word of image data being stored on one line of the K-line buffer, said source edge being spaced from the first boundary of the K-line buffer by M lines in a direction perpendicular to the line direction;

reading data from a block of the K-line buffer in groups of K bits in a direction perpendicular to the line direction; and storing each group of K bits in the storage means between the first and second boundaries of the storage means.

2. A method as claimed in claim 1, wherein a first line of bits of image data on the source edge is stored in line M+1 of the K-line buffer.

3. A method as claimed in claim 2, wherein bits in lines 1 through M of the K-line buffer are set equal to zero before each group of K bits is stored in the storage means.

4. A method as claimed in claim 2, wherein bits in lines 1 through M of the K-line buffer are set equal to zero before the image data is stored in the K-line buffer.

* * * * *